UNITED STATES PATENT OFFICE.

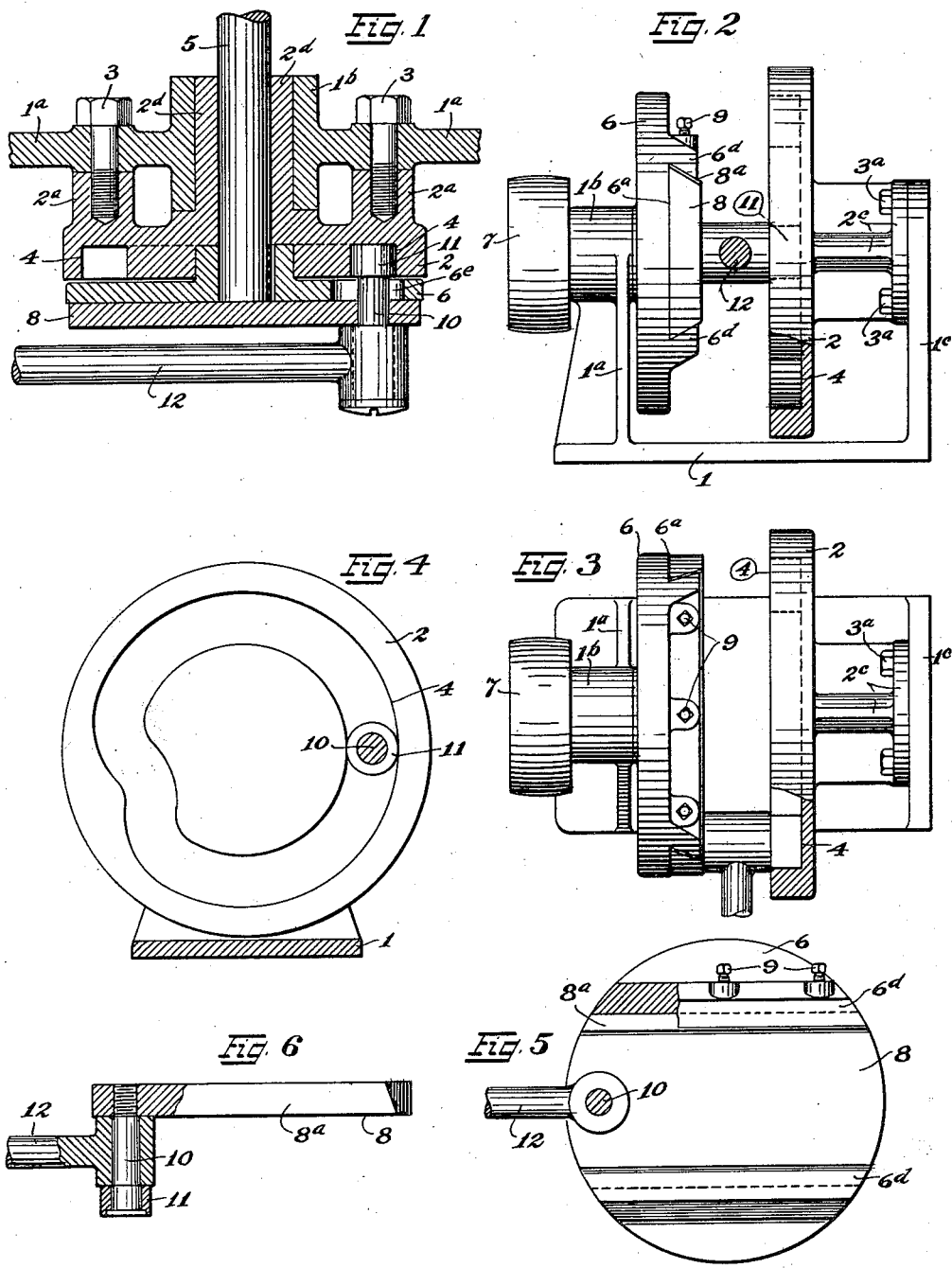

ROBERT G. CLYNE, OF UPPER ALTON, ILLINOIS.

MECHANICAL MOVEMENT.

1,022,621.  Specification of Letters Patent.  Patented Apr. 9, 1912.

Application filed January 26, 1911. Serial No. 604,761.

*To all whom it may concern:*

Be it known that I, ROBERT G. CLYNE, a citizen of Great Britain, residing at Upper Alton, in the county of Madison and State of Illinois, have invented certain new and useful Improvements in Mechanical Movements, of which the following is a specification.

My invention relates to improvements in mechanical movements, the primary object of the invention being to provide a combined cam and crank movement of simple, cheap, and efficient construction, admirably adapted for use in connection with various machines such as planers, shapers, and the like.

The movement may be readily utilized for the production of a uniform speed or movement throughout the entire length of a stroke and at the same time providing for a quick return.

With the above mentioned ends in view, the invention consists in the novel construction, arrangement, and combination of parts, hereinafter described, illustrated in some of its embodiments in the accompanying drawings, and particularly pointed out in the appended claims.

Referring to the drawings, forming a part of this specification, Figure 1, is a central sectional view of the preferred form of mechanism for carrying out my improved mechanical movement. Fig. 2, an end view of a slightly modified form of same. Fig. 3, a top plan view of the form shown in Fig. 2. Fig. 4, a face view of the improved stationary cam or face plate. Fig. 5, a view of the face side of the improved crank disk and slide. Fig. 6, a view of the form of improved crank slide and crank pin used in connection with the form shown in Figs. 2 and 3.

Similar numerals of reference designate like parts throughout all the figures of the drawings.

In carrying out the improved mechanical movement, the parts may be mounted and supported upon a supporting base or frame, consisting, in the present instance, of a base portion 1, provided at one side with a standard or pedestal 1ª, terminating in a bearing head or sleeve 1ᵇ. In the form shown in Figs. 2 and 3 a second standard or pedestal 1ᶜ, may be provided for supporting one of the parts as hereinafter explained.

A stationary cam or face plate 2, is provided, and as a convenient means for mounting said cam plate or disk 2, the same may be secured to the standard or pedestal 1ª, by means of bolts 3, extending through suitable openings in the standard 1ª, and threaded into threaded openings in boss studs 2ª, or the same may be secured on the second standard or pedestal 1ᶜ, by means of bolts 3ª, extending through a flanged and ribbed supporting portion 2ᶜ, as illustrated in Fig. 2 of the drawings.

The stationary cam disk or plate 2, is provided on its face side with a suitably formed cam groove 4, and in the preferred form shown in Fig. 1, is provided with a bearing sleeve portion 2ᵈ, seated or resting within the bearing head or sleeve 1ᵇ, and provided with a bearing opening adapted to receive and contain the driving shaft 5, carrying a crank disk 6. If desired the driving shaft 5, may be provided with a driving pulley 7, carrying a belting communicating with any suitable or convenient source of power.

The crank disk 6, is provided on its face side with a slide way 6ª, adapted to receive and contain a slide 8, preferably extending entirely across the face and central portion of said crank disk as shown, said slide way being preferably formed by means of flanged guide members 6ᵈ, having undercut grooves on their inner sides to form a dovetailed slide way and to receive the correspondingly beveled edges 8ª, of the slide as shown. One of the beveled guide members 6ᵈ, is preferably provided with a plurality of adjusting bolts 9, having their inner ends adapted to impinge against the adjacent beveled edge of the slide for adjusting the latter, as in compensating for wear of the parts and the like. The crank disk 6, is also provided with a guide slot 6ᵉ, of a length corresponding to the throw of the cam groove 4, in the form shown in Fig. 1 of the drawings, said guide slot in the form referred to being adapted to receive and contain an extended portion of the crank pin 10, carried by the slide 8, one end of said crank pin being operatively connected with the stationary cam or disk plate, preferably, by means of a cam roll 11, adapted to travel within the cam groove 4.

As a means for suitably connecting the movement, a connecting rod or arm 12, may be provided, said rod or arm being mounted on the crank pin 10, at one end, and connected at the other with a suitable device or part such for example,—as the ram or slide of a shaper.

In the form of my invention shown in Figs. 2 and 3, the cam roll 11, is mounted on the outer end of the crank pin 10, and moves in a cam groove 4, of a stationary cam plate 2, this arrangement affording ready access to the cam groove 4, and the coöperating parts.

From the foregoing description, taken in connection with the accompanying drawings, the operation and advantages of my invention will be readily understood.

Having thus described some of the embodiments of my invention, what I claim and desire to secure by Letters Patent is,—

1. A mechanical movement, comprising a supporting frame, a driving shaft, a stationary face plate provided with a cam-groove, a crank disk covering said face plate and provided with a slide way and a guide-slot, a slide mounted in said slide way, a crank pin carried by said slide and extending through said guide-slot, a cam-roll mounted on said crank pin and extending in said cam-groove, and a connecting rod carried by said crank pin.

2. A mechanical movement, comprising a base provided with a standard having a bearing head, a stationary cam disk having a bearing sleeve mounted in said bearing head, a driving shaft in said bearing sleeve and provided with a crank disk covering said cam disk, a slide extending across the face of said crank disk and provided with a crank pin in coöperative relation to said stationary cam, means for adjusting said slide in said guide-way and a connecting rod carried by said crank pin.

3. A mechanical movement, comprising a base provided with a standard, a driving shaft carried by said standard and provided with a crank disk having flanged guide members extending across its face and affording an intermediate guide way, a slide mounted in said guide way and corresponding in length to the diameter of said crank disk, means carried by one of said guide members for adjusting said slide in said guide way, a stationary cam removably mounted opposite said crank disk, a crank pin mounted in said slide in coöperative relation to said cam, and a connecting arm carried by said crank pin.

4. A mechanical movement, comprising a supporting frame, a driving shaft carried thereby, a crank disk carried by said driving shaft and provided with flanged guide members extending across its face and affording an intermediate guide-way, a slide mounted in said guide-way and corresponding in length to the diameter of said crank disk, a stationary cam disk at one side and in concentric relation to said crank disk, means for securing said cam disk to said frame in said fixed relation to said crank disk, a crank pin mounted on said slide in coöperative relation to said cam disk, and a connecting rod carried by said crank pin.

5. A mechanical movement, comprising a base provided with a standard having a bearing head, a stationary cam disk having a bearing sleeve mounted in said bearing head, means for removably securing said cam disk to one side of said standard, a driving shaft in said bearing sleeve and provided with a crank disk covering said cam disk, said crank disk being provided with a flanged guide-way extending across its face and a guide slot corresponding to the throw of said cam disk, a slide mounted in said guide way and provided with a crank pin extending through said guide slot in coöperative relation to said cam disk, and a connecting rod carried by said crank pin.

In testimony whereof I have affixed my signature in presence of two witnesses.

ROBERT G. CLYNE.

Witnesses:
HARRY W. KINNON,
S. B. GLEIBER.

Copies of this patent may be obtained for five cents each, by addressing the "Commissioner of Patents Washington, D. C."